United States Patent [19]

McDougall

[11] Patent Number: 4,564,062
[45] Date of Patent: Jan. 14, 1986

[54] RECIRCULATION HEAT EXCHANGER AND APPARATUS INCLUDING SAME

[75] Inventor: Edward E. McDougall, Mackay, Australia

[73] Assignee: Racecourse Co-Operative Sugar Association Ltd., Queensland, Australia

[21] Appl. No.: 329,055

[22] Filed: Dec. 9, 1981

[30] Foreign Application Priority Data

Dec. 9, 1980 [AU] Australia ............................ PE6846

[51] Int. Cl.[4] .......................... F28F 13/06; F28F 1/04; F28F 9/02
[52] U.S. Cl. .................................... 165/108; 165/148; 165/173
[58] Field of Search ............... 165/108, 148, 173, 165, 165/166

[56] References Cited

U.S. PATENT DOCUMENTS

| 709,416 | 9/1902 | Maybach | 165/148 |
|---|---|---|---|
| 978,975 | 12/1910 | Wilson, Jr. | 165/148 |
| 1,109,941 | 9/1914 | Reis et al. | 165/148 |
| 1,428,557 | 9/1922 | Ray | 165/108 |
| 1,670,127 | 5/1928 | Stancliffe | 165/165 |
| 1,745,978 | 2/1930 | Cahill | 165/148 |
| 2,203,904 | 6/1940 | Hammond | 165/148 |
| 2,577,124 | 12/1951 | Newcomer | 165/148 |
| 2,601,973 | 7/1952 | Jensen | 165/166 |
| 3,627,039 | 12/1971 | Tiefenbacher | 165/158 |

FOREIGN PATENT DOCUMENTS

| 343666 | 10/1904 | France | 165/148 |
|---|---|---|---|
| 361353 | 6/1906 | France | 165/148 |
| 1037112 | 9/1953 | France | 165/173 |
| 549783 | 10/1956 | Italy | 165/108 |
| 2042707 | 9/1980 | United Kingdom | 165/148 |

Primary Examiner—William R. Cline
Assistant Examiner—John K. Ford
Attorney, Agent, or Firm—Stevens, Davis, Miller & Mosher

[57] ABSTRACT

A heat exchanger of the kind having a group of upright open ended tubes which are of rectangular cross section. The tubes are in parallel and laterally spaced relationship so that the space between any two adjacent tubes is in direct communication with at least one other space of the same kind. The interconnected spaces form at least part of a steam chamber and spacer bars are provided at one or more sides of the tube group to form a lateral boundary of that steam chamber. Each bar extends parallel to the tubes and is located within the space between the longitudinal outer edges of a respective two tubes. Similar spacer bars are also preferably used to close-off the spaces at the terminal end portions of the adjacent tubes and consequently those bars extend transverse to the axis of each tube. A continuous evaporator may incorporate two such heat exchangers in laterally spaced relationship with a downcomer chamber between them and that chamber is divided into cells by transverse baffles. Two assemblies of such exchangers with interposed downcomer chamber may be arranged side by side in a single vessel to provide a long flow path for the material being processed and the outlet of that vessel may be connected to the inlet of another similar vessel.

7 Claims, 15 Drawing Figures

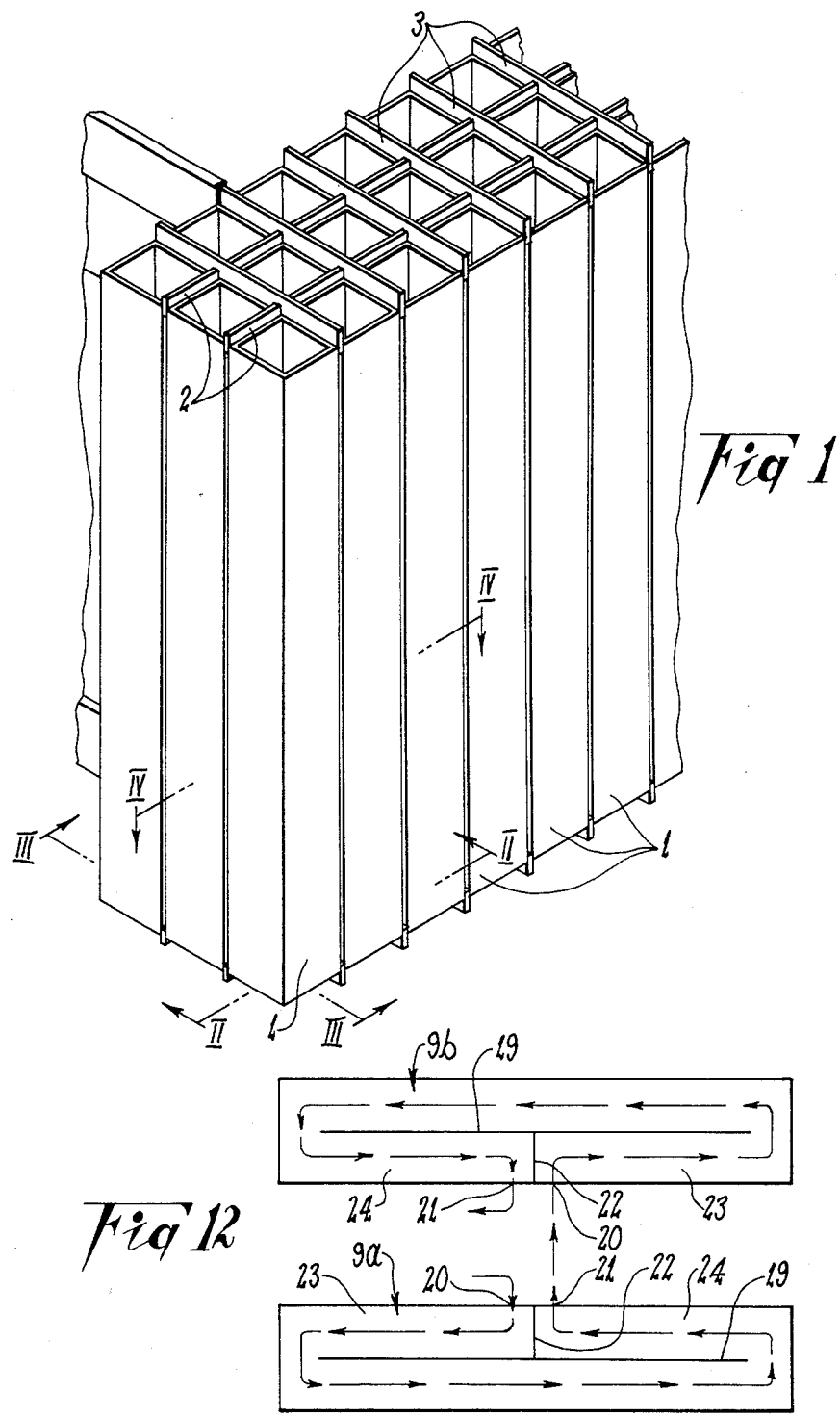

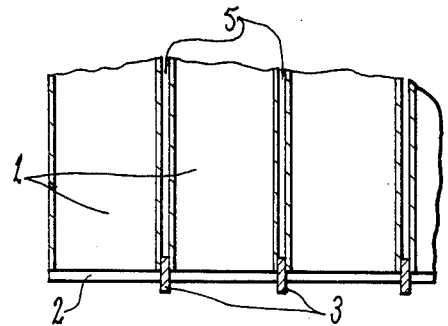
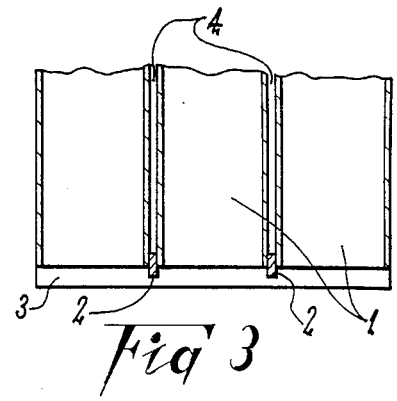
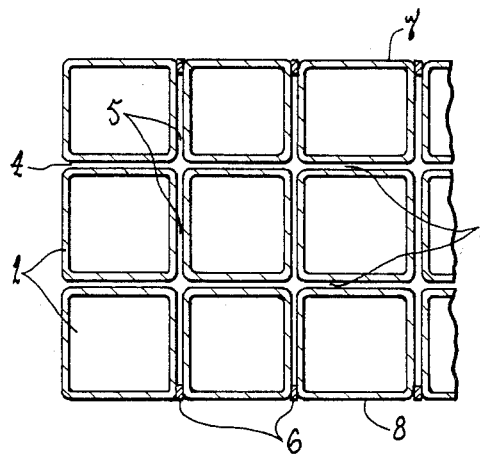
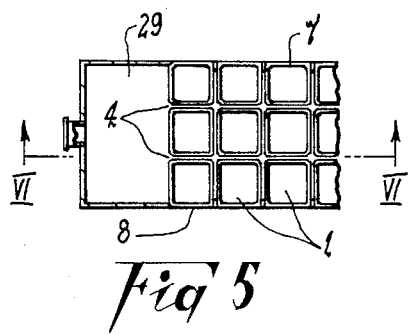
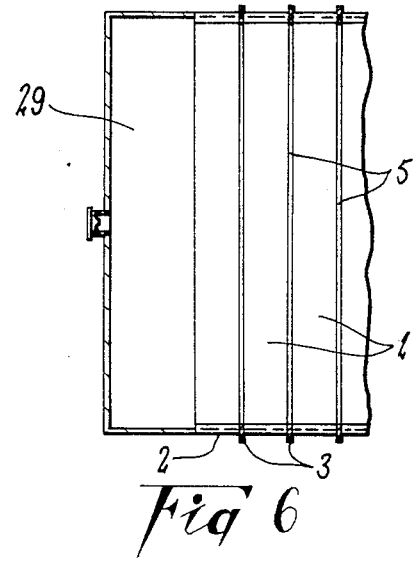

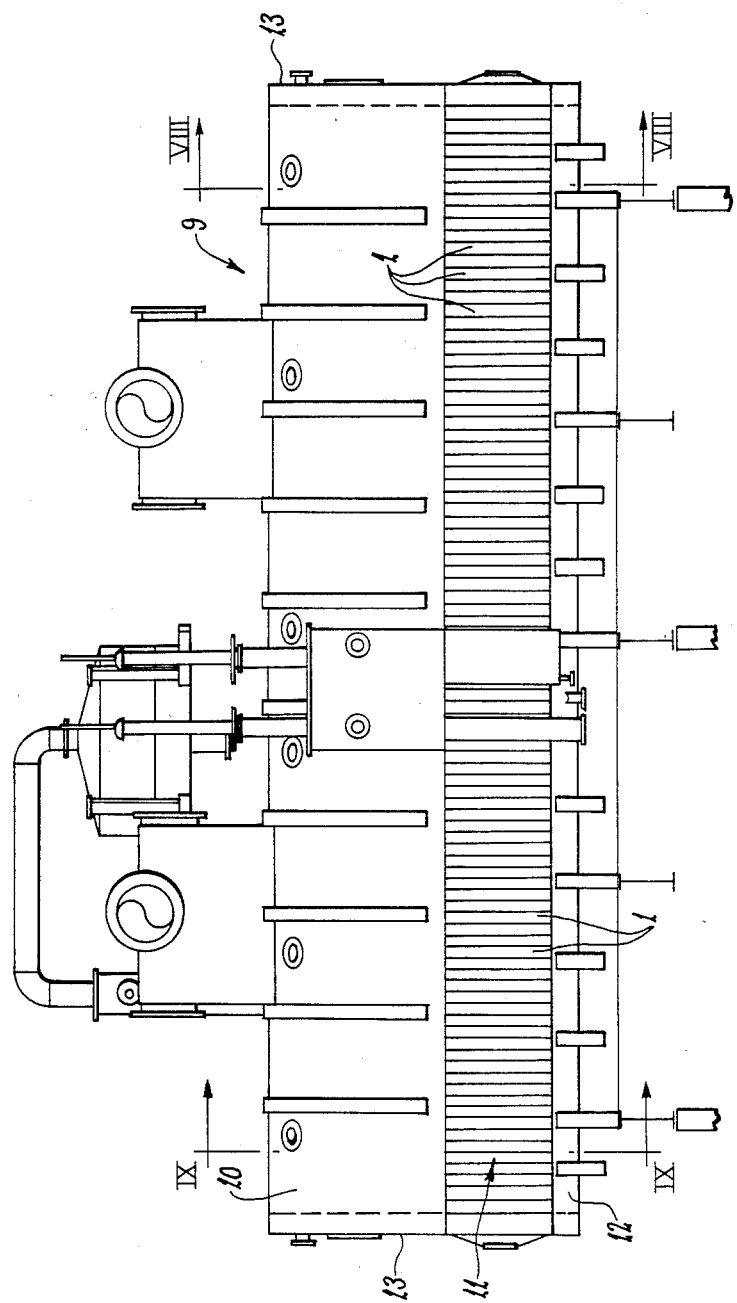

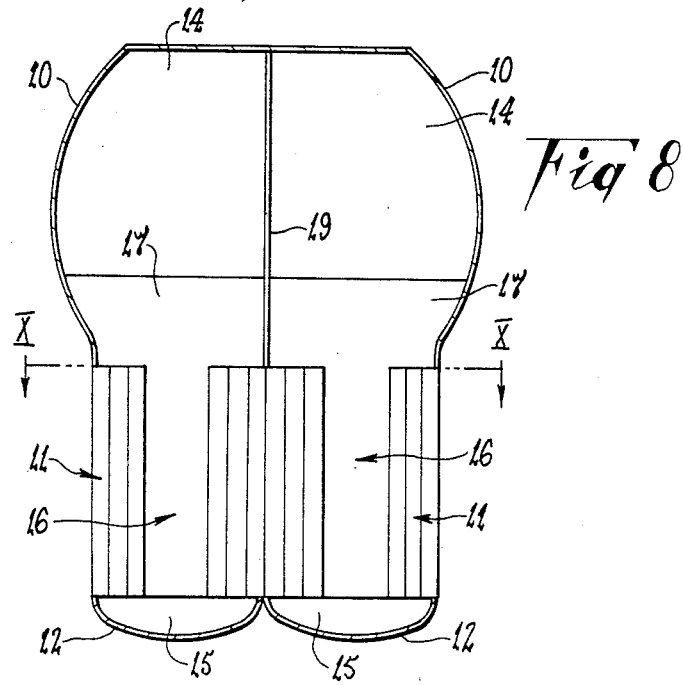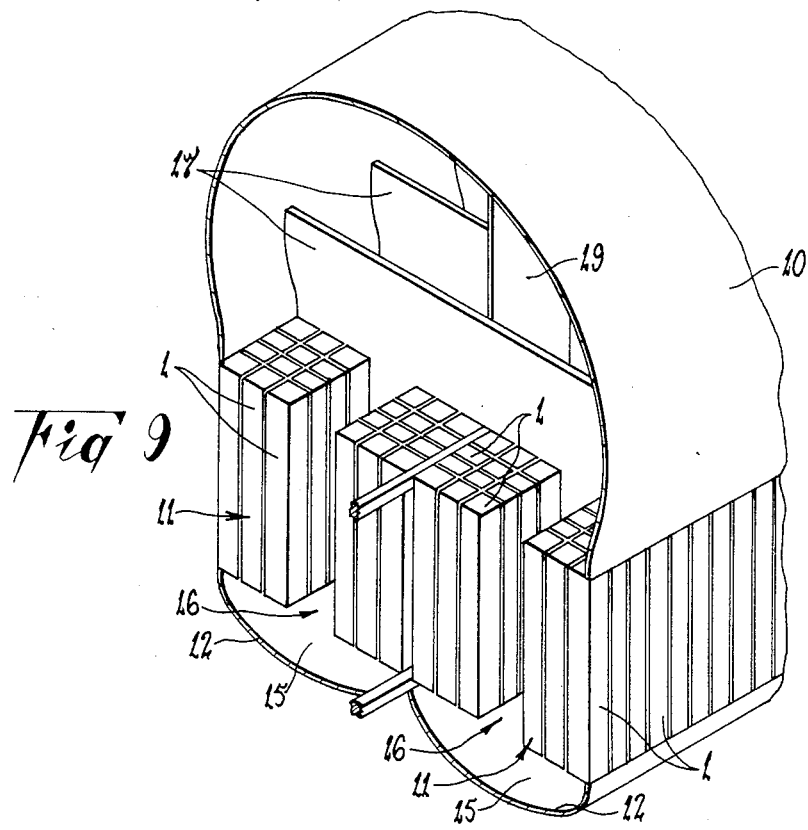

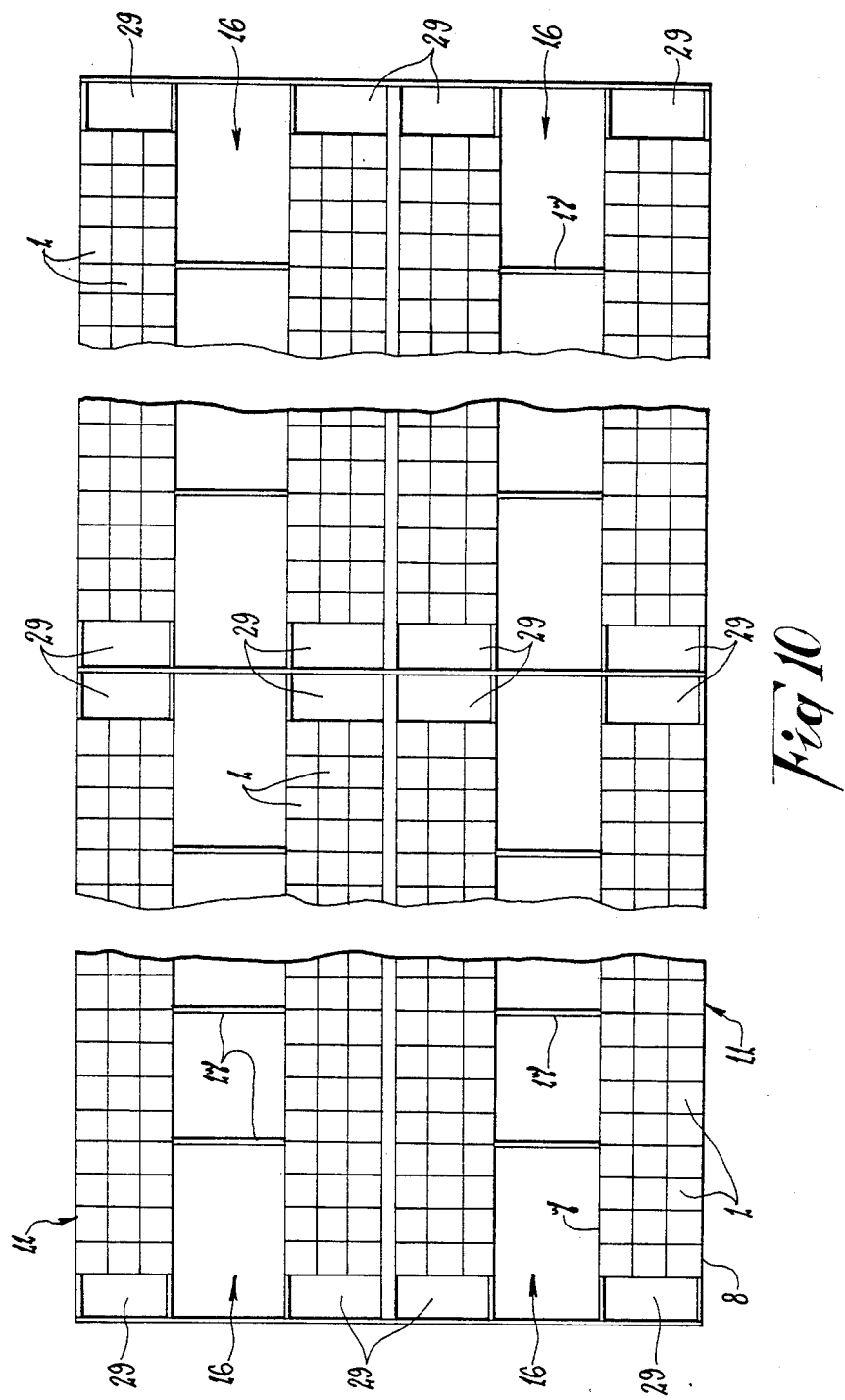

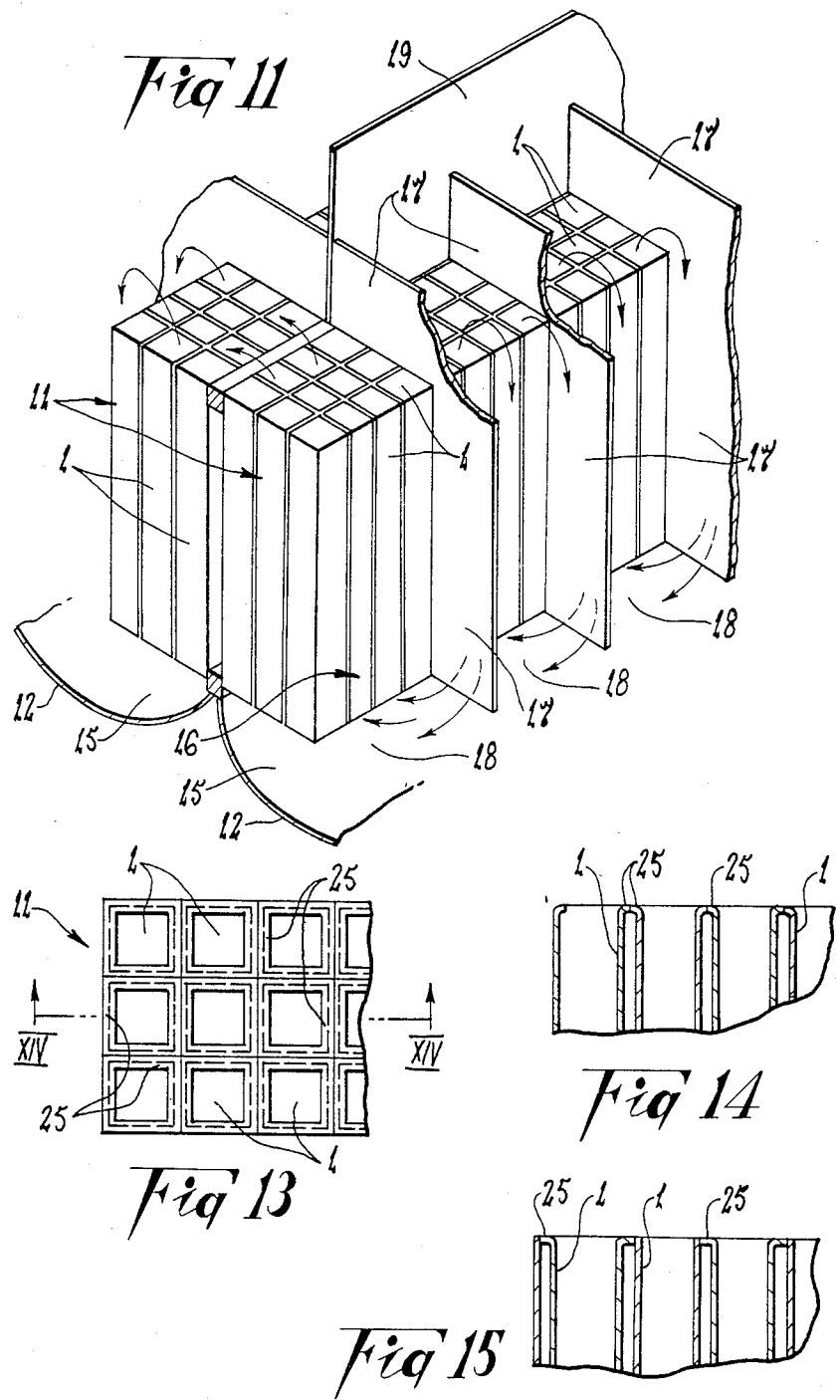

RECIRCULATION HEAT EXCHANGER AND APPARATUS INCLUDING SAME

This invention relates to multiple tube heat exchangers for use with fluids of all kinds. Such heat exchangers have a variety of uses, but it will be convenient to hereinafter describe the invention with particular reference to crystallisation apparatus of the kind used in the sugar industry.

Multiple tube heat exchangers are useful in achieving transfer of heat between two fluids without those fluids coming into contact. In sugar processing for example, steam can give off heat to massecuite through such exchanges. The massecuite flows through the tubes and the steam is contained in the spaces between the tubes and a steam jacket or shell commonly encloses the tube assembly to contain the steam. It is therefore necessary to close-off the ends of the spaces between adjacent tubes and that is generally achieved by welding or otherwise securing the tube ends within respective apertures in apertured plates, commonly referred to as tube plates.

The shell and tube plates must be of sufficient strength and rigidity to withstand the pressures and temperatures encountered in use. In the case of a heat exchanger for massecuite having a non-cylindrical shell, it is usual to provide stenghtening braces for the flat surfaces of the structure.

It is an object of the present invention to provide a tube-type heat exchanger which is of relatively simple yet strong construction. It is a further object of the invention to provide an improved evaporator for use in sugar processing.

According to one aspect of the present invention, there is provided a heat exchanger including, a group of open-ended tubes arranged substantially parallel to one another and in laterally spaced relationship, each said tube being substantially rectangular in transverse cross section, the space between each two adjacent tubes being in direct communication with at least one other said space, spacer means at each of two opposite sides of said group closing-off the space between adjacent tubes, each said spacer means comprising a spacer bar which extends in the longitudinal direction of each said tube and projects into the space between two adjacent said tubes, and a steam chamber formed at least in part by the interconnected spaces between adjacent said tubes.

It is to be understood that the word "rectangular" as used above and in following passages of this specification embraces a square configuration as that is one form of rectangle.

A characteristic of the heat exchanger is that it does not require a shell or tube plate to contain the steam.

According to another aspect of the invention, there is provided a continuous evaporator including a heat exchanger as described above in which the tubes extend upright, said heat exchanger being elongate transverse to the tubes, a downcomer compartment provided along at least one longitudinal side of said heat exchanger, a lower flow chamber interconnecting said downcomer compartment and the lower ends of said heat exchanger tubes, an upper flow space interconnecting said downcomer and the upper ends of said tubes, said heat exchanger tubes and downcomer compartment defining an elongate material flow path, steam supply means connected to said steam chest, a material inlet communicating with one end of said flow path and a material outlet communicating with the opposite end of said flow path.

The essential features of the invention, and further optional features, are described in detail in the following passages of the specification which refer to the accompanying drawings. The drawings however, are merely illustrative of how the invention might be put into effect, so that the specific form and arrangement of the features (whether they be essential or optional features) shown is not to be understood as limiting on the invention.

In the drawings:

FIG. 1 is a perspective view of an end portion of a tube bank of one form of heat exchanger according to the present invention;

FIG. 2 is an enlarged cross sectional view taken along line II—II of FIG. 1;

FIG. 3 is an enlarged cross sectional view taken along line III—III of FIG. 1;

FIG. 4 is an enlarged cross sectional view taken along line IV—IV of FIG. 1;

FIG. 5 is a view similar to FIG. 4 but showing the steam manifold at one end of the tube bank;

FIG. 6 is a cross sectional view taken along line VI—VI of FIG. 5;

FIG. 7 is a side elevational view of a continuous evaporator incorporating an embodiment of the invention;

FIG. 8 is a transverse cross sectional view taken along line VIII—VIII of FIG. 7;

FIG. 9 is a cross sectional view taken along line IX—IX of FIG. 7 but shown in perspective;

FIG. 10 is a view taken along line X—X of FIG. 8 but on a reduced scale and foreshortened for convenience;

FIG. 11 is a view similar to FIG. 9 but with parts removed for convenience of illustration;

FIG. 12 is a diagrammatic view of a double unit evaporator according to the invention;

FIG. 13 is a plan view of portion of another embodiment of the heat exchanger according to the invention;

FIG. 14 is a cross-sectional view taken along line XIV—XIV of FIG. 13; and

FIG. 15 is a view similar to FIG. 14 but showing a variation of that embodiment.

A heat exchanger according to the invention and as shown in the attached drawings, includes a number of parallel open-ended tubes which are of rectangular or square cross sectional shape and are held in mutually spaced relationship by spacer members 2 and 3 at both ends of the tube assembly. The ends of the tube assembly as shown in FIG. 1 are the upper and lower sides of that assembly. Also as seen in FIG. 1 the tubes 1 should preferably be arranged in a plurality of rows so that the heat exchanger is elongate transverse to the longitudinal axis of each tube 1. There may be two or more rows of tubes 1 as required, but there are three rows in the example of FIG. 1. Each two adjacent rows are separated by a space 4 and the adjacent tubes 1 within each row are separated by a space 5 (FIG. 4).

The spacer members 2 and 3 are preferably in the form of metal bars which extend transverse to the tubes 1. Each bar 2 and 3 fits neatly within the space 4 or 5 between the terminal end poritons of two adjacent tubes 1 and may be secured in place by welding. As shown in FIG. 1, each space 4 and 5 is relatively narrow compared with the cross sectional size of the tubes 1 and each bar 2 and 3 is of rectangular cross section. The bars 2 and 3 project edgewise into their respective spaces 4 and 5 so there is maximum resistance to distortion by heat and pressure. The bars 2 and 3 may be arranged to form intersecting components of a grid and such a grid is provided at both the upper and lower sides of the tube assembly to close-off both the upper and lower ends of all of the spaces 4 and 5. Each bar 2 and 3 of the respective grid preferably extends completely across the tube assembly to close-off the entire group of aligned spaces 4 or 5 in which it locates.

It will be appreciated from the foregoing that the tube spaces 4 and 5 form a series of interconnected steam lanes between the tubes 1. The lateral extremeties of the lanes—i.e., at the sides of the tube assembly—are preferably closed by flat spacer bars or strips 6 of rectangular cross section. The bars 6 extend parallel to the tubes 1 and are located edgewise within the lateral extremeties of the aligned group of spaces 5. The cross sectional size of each bar 6 is substantially less than that of a space 5 as existing between any two adjacent tubes 1. Each bar 6 may be welded in place and as shown in FIG. 4 is located so as to form part of the respective side surface of the heat exchanger. Also as shown in FIG. 4, the bars 6 are provided at both the inner and outer sides 7 and 8 of the heat exchanger.

The tube bank as described may have a steam manifold box 29 (FIGS. 5 and 6) at each end. Steam entering the box 29 at one end will move into the adjacent ends of the spaces or steam lanes 4 and will follow those lanes through the entire length of the tube bank. In the course of that travel the steam will penetrate into the spaces 5 which constitute lateral steam lanes and as a consequence the entire surface of each tube 1 is contacted by the steam.

Several advantages are achieved with the construction described. For example, the exchanger requires less material and is therefore of lighter weight than conventional exchangers having the same capacity. Also, the structure is relatively strong as the unsupported flat surfaces are of comparatively small area and can therefore withstand substantial pressure. Still further, there is a greater heating surface concentration than is the case with conventional circular tube heat exchangers so that the exchanger occupies less space than the conventional exchanger. Heat losses due to radiation to atmosphere are also minimized by the novel construction so that insulation costs are avoided or minimized.

As previously stated the heat exchanger of this invention is particularly suited for use in apparatus for sugar processing. In one arrangement, the exchanger is used as part of a continuous evaporator for sugar processing. That evaporator is an improvement over prior evaporators of the same kind for several reasons, but perhaps the most significant features (other than the heat exchanger) are the tube and downcomer arrangement and the relatively long flow path within the evaporator. One form of the evaporator is shown in FIGS. 7 to 11 of the drawings.

The evaporator 9 comprises a relatively long body composed of an upper shell 10, heat exchangers 11, a lower shell 12 and end walls 13. They are not the only components of the evaporator body, but they are the principal components for the purpose of the present discussion. As best seen in FIG. 8, the upper shell 10 contains an upper flow space 14 and the lower shell 12 contains a lower flow chamber 15. In the construction shown there are two flow spaces 14 and two flow chambers 15 because the evaporator 9 is a double flow path unit as hereinafter described. The general construction and operation of the evaporator however, can be explained by reference to one side only of the unit.

The lower flow chamber 15 and the upper flow space 14 are interconnected through the heat exchanger tubes 1 and a downcomer compartment 16 located beside the heat exchanger 11. In different arrangements however, more than one downcomer may be involved. The lower shell 12 may be curved in transverse cross section as shown to provide a concave support for the massecuite and the chamber 15 may be connected as appropriate to the massecuite supply. It is preferred to have two banks of heat exchangers 11 separated by a single downcomer compartment 16 which is consequently of rectangular shape both in plan and transverse cross section. The upper flow space 14 preferably has a series of transverse baffles 17 which divide the compartment 16 into a series of cells 18 (FIG. 11). Each transverse baffle 17 preferably extends above the upper end of the tubes 1, but does not intrude (at least significantly) into the lower flow chamber 15.

The baffles 17 promote a desired flow pattern along the length of the evaporator. As shown in FIG. 11, massecuite heated within the exchangers 11 flows upwardly through the tubes 1 to spill over into the downcomer compartment 16, or more correctly the adjacent cell 18 of that compartment. The massecuite flows downwardly within each cell 18 to pass beneath one of the baffles 17 to enter the lower ends of the tubes 1 adjacent to the next cell 18. The flow is in one direction lengthwise of the evaporator and because of the baffles 17 the line of flow is somewhat sinuous. That is, as the massecuite passes along the length of the evaporator it alternately moves upwardly through a section of a heat exchanger 11 and then downwardly through a cell 18 of the downcomer compartment 16.

An evaporator as described has the particular advantage that each heat exchanger 11 can form part of the side wall of the apparatus. That is, there is no need for a jacket or shell along the outside of the heat exchanger to contain the steam.

Although the evaporator may constitute a single vessel as described above, it is preferred to have a plurality of flow paths and/or vessels arranged in series. This can be achieved for example by constructing a double flow path unit as shown in FIGS. 8 to 11. In such a unit one heat exchanger 11 of one flow path lies along side one of the heat exchangers 11 of the other flow path and consequently those two heat exchangers can be constructed as a single assembly. A longitudinal dividing wall 19 separates the upper flow spaces 14 of the two flow paths as shown in FIGS. 8 and 9. It is necessary however, to provide transfer means whereby the massecuite can move from one end of one flow path into the beginning of the other and in the construction shown in FIGS. 9 to 11 that is achieved by terminating the dividing wall 19 before the downcomer cells 18 at the adjacent ends of the two flow paths. Massecuite can then flow from one side of the evaporator to the other at that location as shown in FIG. 11.

In the construction shown in FIG. 10, a transfer facility as described above is provided at each end of the evaporator 9 because the inlet 20 and the outlet 21 for the massecuite are both located between the ends of the evaporator 9 and on one side thereof. A transverse wall 22 divides that side of the evaporator 9 into two sections—an inlet section 23 and an outlet section 24—and those two sections communicate through the flow path provided at the other side of the evaporator 9.

Very long flow paths can be accommodated by arranging double units as described above side by side in a single assembly as shown diagrammatically in FIG. 12. With that arrangement the massecuite enters the first unit 9a at the centrally located inlet 20, flows towards one end of that unit where it is then directed across to the parallel but opposite flow path within the same double unit 9a. On reaching the opposite end of the unit 9a it is again redirected to the initial side and flows to the outlet 21, which is located adjacent to the inlet 20. The division wall 22 separates the inlet 20 from the outlet 21 thus defining both the beginning and the end of the flow circuit through the unit 9a. From the outlet 21 of the first unit 9a, the massecuite enters the second unit 9b which has a similar flow circuit to that described for the first unit 9a. Any number of units can be so arranged in series to suit particular circumstances.

The evaporator 9 as described may include the usual entrainment devices and other components as required.

FIGS. 13 and 14 show a variation of the heat exchanger particularly described in which the spacer members at each end of the tube assembly are formed by parts of the tubes 1 rather than by separate bars 2 and 3 as described. In the example shown, each end of each tube 1 is swaged to form an outwardly extending flange 25 and in the assembled condition of the tubes 1 the flanges 25 abut in edge to edge relationship. The abutting edges can be permanently secured by welding. Under some circumstances as shown in FIG. 15, it may not be necessary for all tubes 1 to have swaged ends as the swaged end of one tube 1 may provide a sufficient space around that tube 1 if the edges of the resulting flange 25 are welded to abutting side surfaces of adjacent tubes 1.

Finally, it is to be understood that various alterations, modifications and/or additions may be introduced into the constructions and arrangements of parts previously described without departing from the spirit or ambit of the invention as defined by the appended claims.

Having how described my invention what I claim as new and desire to secure by Letters Patent is:

1. A heat exchanger including, a group of open-ended tubes arranged substantially parallel to one another, each said tube being substantially rectangular in transverse cross-section, said group being formed by a plurality of substantially parallel and laterally spaced rows of said tubes, adjacent tubes of each said row being laterally spaced apart, the transverse cross-sectional area of the space between each two adjacent tubes of the same and different said rows is substantially smaller than the transverse cross-sectional area of each said tube, transverse spacer means at each of two opposite ends of said group closing-off the space between the terminal end portions of adjacent tubes of both the same and different said rows, a steam chamber formed at least in part by the interconnected spaces between adjacent said tubes, a plurality of longitudinal spacer members provided at each of two opposite sides of said group of tubes, each said spacer member comprises a flat metal bar which extends in the longitudinal direction of said tubes and is located edgewise within the space and between a respective two adjacent said tubes, the transverse cross-sectional size of each said spacer member is substantially less than the transverse cross sectional size of the said space within which it locates, each said spacer member is located at the periphery of said group of tubes and closes off the space between the respective said adjacent tubes at the respective said side of the group of tubes, and the surface of each said tube which extends between each two adjacent said spacer members forms part of an external surface of said heat exchanger.

2. A heat exchanger according to claim 1, wherein each said spacer member is secured by welding to each said adjacent tube.

3. A heat exchanger according to claim 1, wherein said transverse spacer means comprise spacer bars extending transverse to the longitudinal axis of said tubes and projecting into said end portion spaces.

4. A heat exchanger according to claim 1, wherein said transverse spacer means comprise flanged ends provided on at least each alternate said tube.

5. A heat exchanger according to claim 1, including a compartment forming part of said steam chamber provided at each of the other two sides of said group of tubes, and the interior of each said compartment communicating directly with the spaces between the tubes at the adjacent said side of the group of tubes.

6. A heat exchanger according to claim 1, wherein each said transverse spacer means comprises a series of intersecting flat spacer strips each of which extends transverse to the longitudinal axis of each said tube, a longitudinal edge portion of each said strip projects into the space between the terminal end portions of at least two adjacent tubes.

7. A heat exchanger according to claim 6, wherein each said strip is secured by welding to each said adjacent tube.

* * * * *